(12) United States Patent
Baumgartner

(10) Patent No.: US 6,684,985 B1
(45) Date of Patent: Feb. 3, 2004

(54) COMPRESSED AIR-OPERATED DISC BRAKE

(75) Inventor: Hans Baumgartner, Moosburg (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 10/089,227

(22) PCT Filed: Jul. 26, 2000

(86) PCT No.: PCT/EP00/07154

§ 371 (c)(1),
(2), (4) Date: Jul. 19, 2002

(87) PCT Pub. No.: WO01/23772

PCT Pub. Date: Apr. 5, 2001

(30) Foreign Application Priority Data

Sep. 29, 1999  (DE) ......................................... 199 46 680

(51) Int. Cl.$^7$ ............................. F16D 55/08; F16J 15/18
(52) U.S. Cl. .......................................... 188/72.8; 92/168
(58) Field of Search ................... 92/98 R, 168, 92/63; 188/72.1, 72.6, 72.8, 72.9

(56) References Cited

U.S. PATENT DOCUMENTS

| | | | |
|---|---|---|---|
| 5,392,691 A | * | 2/1995 | Schultz ........................ 92/168 |
| 5,697,474 A | | 12/1997 | Antony et al. |
| 6,220,401 B1 | * | 4/2001 | Roberts et al. ............ 188/72.9 |
| 6,354,187 B1 | * | 3/2002 | Plantan et al. .............. 92/98 R |

FOREIGN PATENT DOCUMENTS

| | | |
|---|---|---|
| DE | 195 15 019 | 10/1996 |
| WO | WO 97/13987 | 4/1997 |

\* cited by examiner

Primary Examiner—Christopher P. Schwartz
(74) Attorney, Agent, or Firm—Crowell & Moring LLP

(57) ABSTRACT

The invention relates to a compressed air-operated disk brake comprising a brake caliper to which a compressed air cylinder can be attached via a flange and in which a turning lever can be pivoted by a plunger rod of the compressed-air cylinder. The inventive disk brake should be designed in such a way that the interior of the brake caliper is protected from the penetration of dirt and moisture when the compressed air cylinder has not yet been attached, in particular, during transport and storage. In addition, no additional working operations should be required for mounting the brake cylinder, and no parts need to be disposed of. According to the invention, a cover, which is closed at first, is placed in the flange opening of the brake caliper and is provided with specified rupture locations. Since the cover does not project beyond the outer surface of the flange, it does not impede the subsequent attachment of the compressed air cylinder. After mounting the compressed air cylinder, the cover is torn open along the weakened lines or the specified rupture locations by Extending the plunger rod.

23 Claims, 3 Drawing Sheets

COMPRESSED AIR-OPERATED DISC BRAKE

BACKGROUND AND SUMMARY OF THE INVENTION

The invention relates to a pneumatically operated disk brake having a caliper which straddles a brake disk and which, on one side, is equipped with an application device having a swivellably disposed rotary lever engaging with the plunger rod of a compressed-air cylinder. The caliper is sealed-off by means of bellows surrounding the plunger rod, and, on the side facing the compressed-air cylinder, the caliper has a flange bounding a flange opening, for the connection of the compressed-air cylinder.

The concerned pneumatically operated disk brake is preferably used for commercial road vehicles. The compressed-air cylinder is fastened by means of threaded bolts to the flange of the caliper. The bellows surrounding the plunger rod of the compressed-air cylinder prevent moisture or dirt that penetrates into the interior of the caliper, whereby the corrosion-susceptible actuating mechanism would be damaged. The bellows are designed such that they have a ring-shaped seal on the side facing the caliper. As a result, a sufficient sealing is achieved at the point of intersection between the compressed-air cylinder and the caliper, but only when the compressed-air cylinder is mounted.

The compressed-air cylinder is not connected to the caliper by the manufacturer of the brake, but rather by an axle manufacturer during the mounting of the axles or by a vehicle manufacturer when mounting the axle equipped with the brakes on a commercial vehicle. This circumstance is the result of the fact that the required size of the compressed-air cylinder can be determined only in these phases. This leads to the fact that the flange opening is only insufficiently covered during the entire shipping and transport of the disk brake from the brake manufacturer to the axle manufacturer and possibly also to the vehicle manufacturer. In this case, attention should also be paid to the fact that the brakes equipped with the axles are frequently stored in the open air for an extended period of time. This results in the danger that water or moisture may penetrate into the interior of the caliper and cause corrosion.

In practice, the flange opening is closed by a glued-on foil for protecting the actuating mechanism. This prevents foreign bodies from penetrating into the interior of the caliper, but provides no protection against the entering of moisture, particularly when the axles equipped with the brakes are stored in the open air. In addition, the glued-on foil can very easily be destroyed. No solution is therefore achieved which meets the requirements existing in practice. If it is known that the axles equipped with the brakes are stored in the open air (outdoors), the flange opening of the caliper is normally closed off by a screwed-on plastic flange into which a sealing element is integrated. Although this sufficiently seals off the flange opening, this solution involves considerable cost caused by the additional components as well as by the mounting and demounting expenditures. In addition, the plastic flange must be disposed of or transported back to the brake manufacturer.

Finally, it is known from International Patent Document WO 97/13987 to insert a seal having a centric opening into the flange opening. In the inoperative position of the rotary lever, the latter comes in contact with the seal, so that a sealing-off takes place. Relatively large positional tolerances occur in the assignment of the sealing surface of the rotary lever to the sealing lip of the seal. As a result, the penetration of moisture cannot be prevented very effectively. In addition, the dome-shaped receiving device for the plunger rod of the compressed-air cylinder, which is situated in the rotary lever, is outside the protected area, so that specifically this particularly susceptible point will corrode if stored for an extended time period. Furthermore, during the mounting of the compressed-air cylinder, moisture may reach the interior of the caliper.

Based on the prior art known from International Patent Document WO 97/13987, it is an object of the invention to design a pneumatically operated disk brake such that the interior of the caliper and the actuating mechanism mounted therein, while the compressed-air cylinder is not yet connected, is protected against a penetration of dirt and moisture during the transport and the storage. Also, if possible, no additional operations should be required for the mounting of the compressed-air cylinder and, furthermore, no components should have to be disposed of or transported back.

According to the present invention, the above-mentioned object is achieved in that a covering cap, which is closed at first but has desired breaking points, is inserted into the flange opening of the caliper.

As a result of the completely closed covering cap, which is inserted into the flange opening, it is ensured also over a long period of time that, even when the disk brake is stored in the open air, no dirt or moisture will penetrate into the interior of the caliper because the covering cap completely covers the flange opening. Because it is provided with desired breaking points, the covering cap can be torn open along these points. Although this could also take place before the mounting of the compressed-air cylinder, the tearing-open takes place no later than when the plunger rod of the compressed-air cylinder is extended for the first time. The operation of the disk brake is not hindered by the torn-open covering cap. Because it can remain in the flange opening, a disposal or return to the brake manufacturer is eliminated. After the mounting of the compressed-air cylinder, the ring-shaped seal of the bellows seals off the caliper in the customary manner.

It is particularly advantageous for the covering cap not to protrude with respect to the outer surface of the flange because it does not hinder the mounting of the compressed-air cylinder.

Particularly advantageously, the covering cap is force-lockingly inserted into the flange opening. Additional securing elements, which would cause mounting expenditures and costs, will then be eliminated. The restoring forces building up during the insertion effectively prevent the covering cap from falling-out out of the flange opening during the transport of the disk brake. This force closure between the outer edge of the covering cap and the flange opening can be achieved in a particularly simple manner if the covering cap is made of an elastic material, for example, of an elastomer or of an elastomer-type synthetic material.

With respect to the manufacturing, the desired breaking points can be most easily obtained if they are designed as a weakened line, for example, in the form of indentations, notches or the like. Because, after the mounting of the compressed-air cylinder, the center area must be free for the plunger rod, it is expedient for the weakened lines to extend from the center of the circular covering cap radially toward the outside, the weakened lines then being situated at a mutually identical angular distance.

So that the covering cap is torn open only along the desired breaking points, it is provided that the covering cap has a ring-shaped elevation adjoining the ends of the desired breaking points facing the outer circumferential surface. This elevation should be understood in the sense of a reinforcement. To ensure that the outer edge of the covering cap is extremely stable, it is provided that this edge area has a U-shaped construction and that a metallic reinforcing ring in inserted therein. This metallic reinforcing ring has an angled cross-section so that its web, extending toward the center of the cap, reaches behind a ring-shaped attachment of the cap. For ensuring that the covering cap will not hinder the mounting of the compressed-air cylinder, the covering cap is arranged within the flange opening with respect to the outer surface of the flange in the direction of the brake disk.

The invention will be explained in detail by means of the attached drawings.

DETAILED DESCRIPTION OF THE DRAWINGS

For the purpose of a simplified illustration, the pneumatically operated disk brake, as a whole, is not illustrated in the figures.

Figure 1:
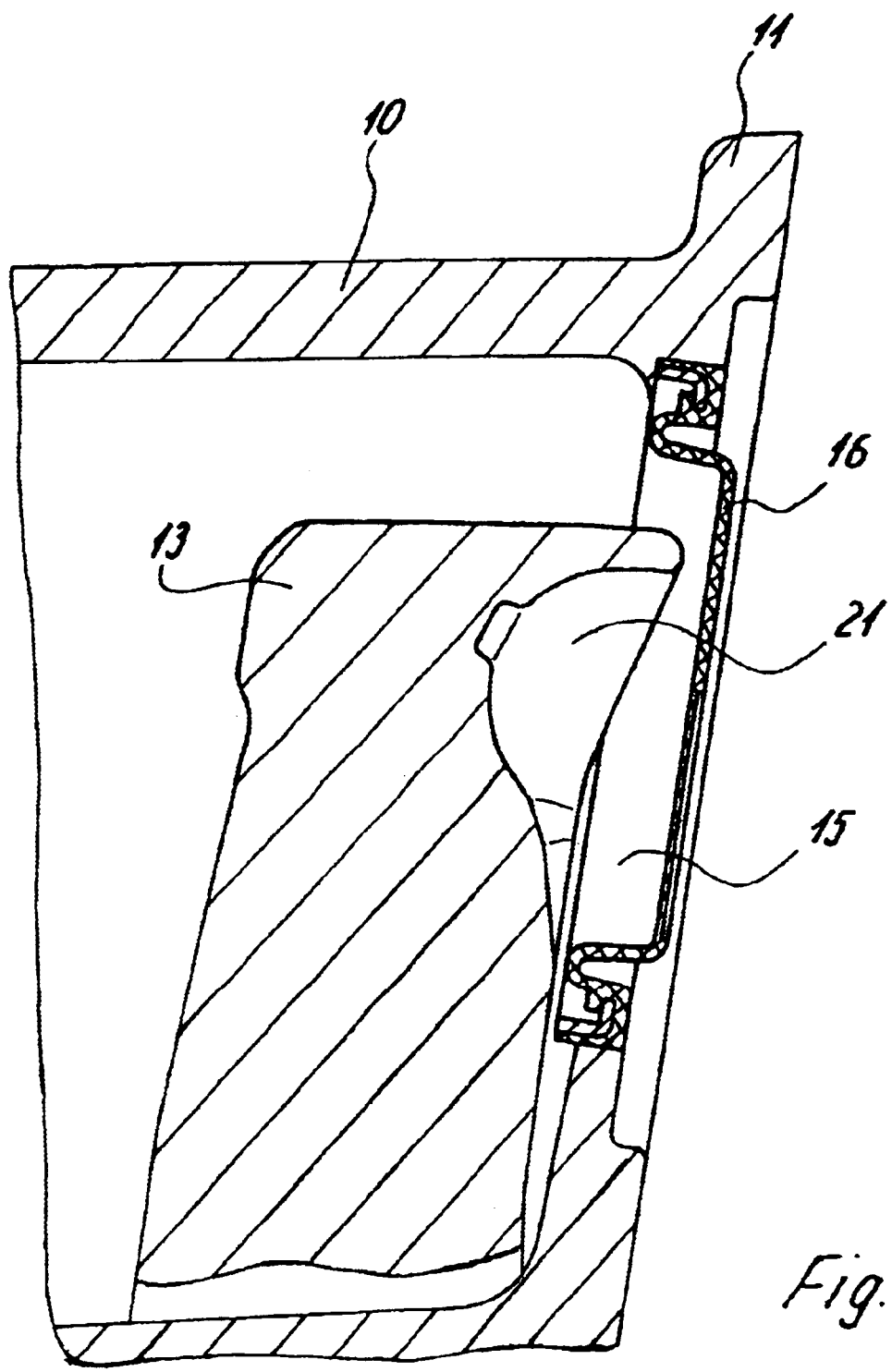
FIG. 1 is a sectional view of the covering cap which is inserted into the flange opening of the caliper in which is arranged the rotary lever.
Figure 2:
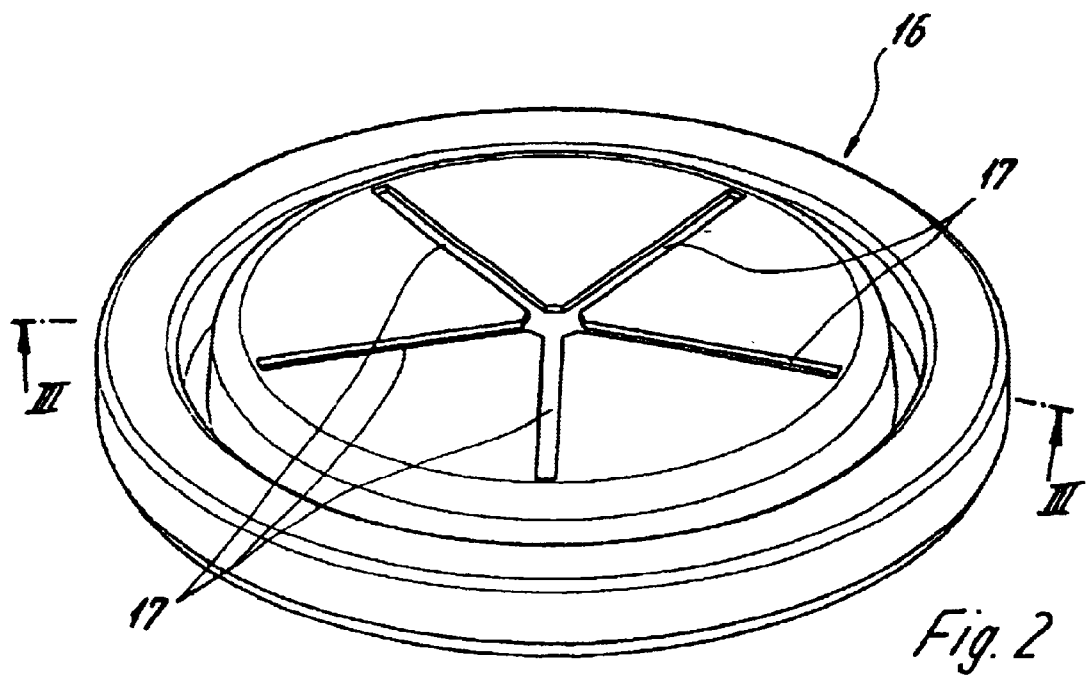
FIG. 2 is a perspective top view of the covering cap.
Figure 3:
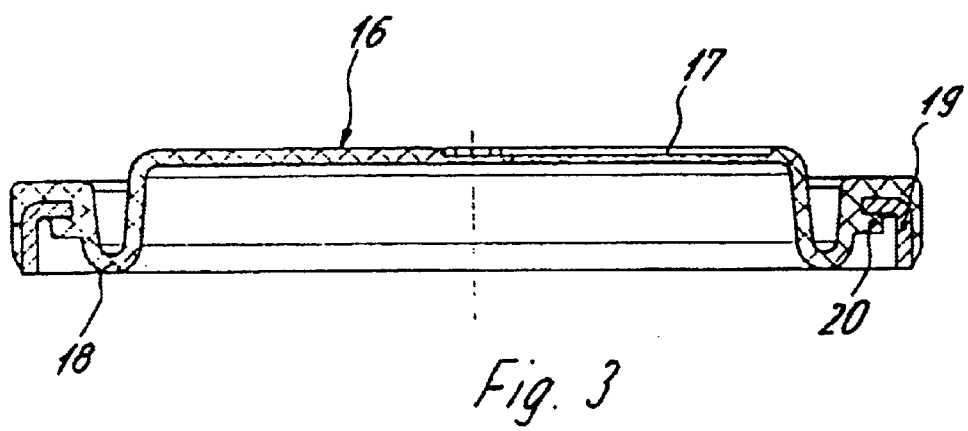
FIG. 3 is a sectional view taken along Line III—III in FIG. 2.
Figure 4:
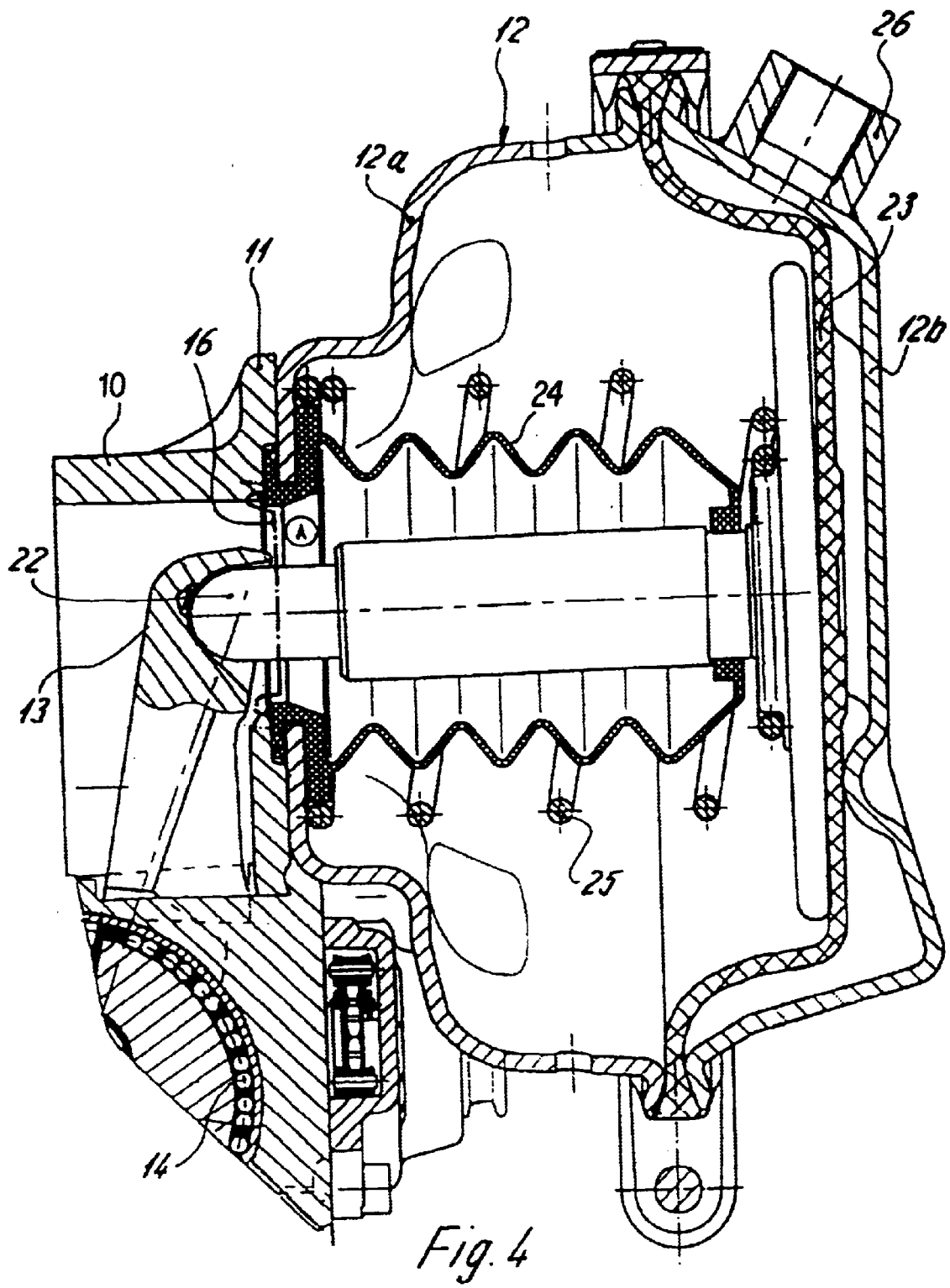
FIG. 4 is a sectional view of the compressed-air cylinder mounted on the connection flange of the caliper and coupled with the rotary lever.

FIG. 1 shows that the outlined caliper 10 has a flange 11 for, according to FIG. 4, connecting a compressed-air cylinder 12 thereto. A rotary lever 13 is swivellably disposed in the caliper 10 by means of a bearing 14 not explained in detail. A covering cap 16, which is explained in greater detail by means of FIGS. 2 and 3, is inserted in the flange opening 15 in a closing manner. As shown in FIGS. 1 to 3, the covering cap 16 is closed with respect to its entire surface in the illustrated condition. This condition exists when, in contrast to the representation according to FIG. 4, the compressed-air cylinder 12 is not yet connected to the flange 11 of the caliper 10. In the illustrated embodiment, the covering cap 16 is provided with five weakened lines 17, each forming a desired breaking point. The weakened lines 17 are formed by indentations. The weakened lines 17 extend from the center of the circular covering cap 16 in the direction of the outer edge. They are also situated at an identical angular distance from one another.

A ring-shaped elevation 18, which may be considered as a reinforcement, adjoins the outer edges assigned to the circumference of the covering cap 16. The outer edge of the covering cap 16 has a U-shaped cross-section design. In this case, the open side of the U-shaped cross-section points in the direction of the brake disk, which is not shown, when the covering cap 16 is inserted in the flange opening 15. A metallic reinforcing ring 19 is inserted into this outer edge, which reinforcing ring 19 has an angled cross-section and whose leg, pointing toward the center of the cap 16 reaches behind a ring-shaped attachment 20. The covering cap 16 is made of an elastic material, preferably an elastomer or an elastomer-type synthetic material.

Of the actuating mechanism (brake application device) installed in the caliper 10, FIGS. 1 and 4 show only the rotary lever 13. On the side facing the compressed-air cylinder 12, this rotary lever 13 is provided with a dome-type recess 21, which is situated in the contour of the flange opening 15. The assigned, correspondingly designed end of a two-part plunger rod 22 engages in this dome-shaped recess 21. The compressed-air cylinder 12 consists essentially of the two housing parts 12a, 12b, of a membrane 23 clamped between the partition line, of bellows 24 surrounding the plunger rod 22, and of a restoring spring 25. By means of the membrane 23, the housing formed of the housing parts 12a and 12b is airtightly divided into two chambers. The outer chamber facing away from the caliper 10 is equipped with a compressed-air connection 26. For the perfect sealing-off of the interior of the caliper 10, the facing end of the bellows 24 is designed in the manner of a seal which reaches in a U-shape around the edge of a housing part 12a bounding an opening.

The manufacturer of the pneumatically operated disk brake supplies the caliper in the condition illustrated in FIG. 1; that is, the compressed-air cylinder 12 is not yet connected to the flange 11. The covering cap 16, which is closed in itself, hermetically seals off the flange opening 15, so that, also in the case of an extended storage in the open air, neither dirt particles nor moisture can penetrate into the interior of the caliper 10. FIG. 1 illustrates that no additional operations are required for the mounting of the compressed-air cylinder 12, because the covering cap 16 remains in the flange opening 15. Although, during the mounting, the covering cap 16 can be torn open along the weakened lines or weakened zones 17, it is not required that this take place any sooner than when the plunger rod 22 has moved-out (been extended). The covering cap 16 does not interfere with the further operation of the pneumatically operated disk brake. In the embodiment according to FIG. 1, the flange 11 is inclined relative to a vertical line, while, in the embodiment according to FIG. 4, it extends in the vertical direction.

The invention is not limited to the illustrated embodiment. It is important that the covering cap 16 be inserted into the flange opening 15 so it does not hinder the subsequent mounting of the compressed-air cylinder and that, no later than during the start of the operation of the disk brake, the covering cap is torn open along desired breaking points.

What is claim is:

1. Pneumatically operated disk brake having a caliper which in use straddles a brake disk and which, on one side, is equipped with an actuating mechanism having a swivellably disposed rotary lever engaging with a plunger rod of a compressed-air cylinder, the caliper being sealed off via bellows surrounding the plunger rod, and, on the side facing the compressed-air cylinder, the caliper having a flange bounding a flange opening, for mounting the compressed-air cylinder, wherein a covering cap is inserted into the flange opening of the caliper, the covering cap being initially closed to seal-off the flange opening, prior to the plunger rod engaging with the rotary lever, and having desired breaking points arranged therein.

2. Pneumatically operated disk brake according to claim 1, wherein the covering cap is made of an elastic material.

3. Pneumatically operated disk brake according to claim 2, wherein the elastic material is one of an elastomer and an elastomer-type synthetic material.

4. Pneumatically operated disk brake according to claim 1, wherein the desired breaking points are formed by weakened lines, which extend from a center area of the covering cap in a direction of the outer edge.

5. Pneumatically operated disk brake according to claim 4, wherein the weakened lines are formed by indentations.

6. Pneumatically operated disk brake according to claim 1, wherein the covering cap does not protrude with respect to the outer surface of the flange.

7. Pneumatically operated disk brake according to claim 1, wherein the covering cap is inserted in the flange opening of the caliper such that, after the mounting of the compressed-air cylinder, as a result of the extension of the plunger rod, the covering cap is torn open along the desired breaking points.

8. Pneumatically operated disk brake according to claim 1, wherein the covering cap is force-lockingly inserted into the flange opening.

9. Pneumatically operated disk brake according to claim 1, wherein the desired breaking points are situated at an identical angular distance from one another.

10. Pneumatically operated disk brake according to claim 1, wherein the covering cap has a ring-shaped elevation adjoining ends of the desired breaking points pointing towards an outer circumferential surface of the covering cap.

11. Pneumatically operated disk brake according to claim 1, wherein an outer edge area of the covering cap has a U-shaped cross-section having an open side, relative to the installed condition, directed toward the brake disk, and further wherein a metallic reinforcing ring is inserted into the U-shaped cross-section of the outer edge area.

12. Pneumatically operated disk brake according to claim 1, wherein the desired breaking points are formed by indentations.

13. Pneumatically operated disk brake according to claim 1, wherein a center area of the covering cap having the desired breaking points is offset with respect to the outer surface of the flange in a direction of the brake disk.

14. A disk brake caliper having an interior space, comprising:
   a mounting flange upon which an operating member is mountable, the mounting flange bounding a flange opening to the interior space;
   a covering cap inserted into the flange opening to seal-off the flange opening to the interior space of the caliper, the covering cap being initially closed and having arranged therein desired breaking points.

15. The disk brake caliper according to claim 14, wherein the desired breaking points are in the form of weakened lines, which weakened lines extend from a center area of the covering cap toward peripheral edges thereof.

16. The disk brake caliper according to claim 15, wherein the covering cap is substantially circular.

17. The disk brake caliper according to claim 16, wherein the weakened lines are arranged at a substantially identical angular distance from one another.

18. The disk brake caliper according to claim 14, wherein the covering cap is arranged within the flange opening so as not to protrude with respect to an outer surface of the flange.

19. The disk brake caliper according to claim 14, wherein the covering cap is force-lockingly arranged in the flange opening.

20. The disk brake caliper according to claim 14, wherein the covering cap is made of an elastic material.

21. A disk brake assembly, comprising:
   a caliper having an interior space and a mounting flange, the mounting flange bounding a flange opening;
   a covering cap arranged within the flange opening to seal-off the flange opening to the interior space, the covering cap being initially closed and having arranged therein desired breaking points;
   an operating member mounted on the mounting flange, said operating member having a plunger rod that engages with an actuating member arranged in the interior space of the caliper to operate the disk brake assembly; and
   wherein said plunger rod tears open the covering cap along the desired breaking points when first operated to break the seal and engage the actuating member.

22. A method of sealing a disk brake caliper having an interior space and a mounting flange bounding a flange opening of the caliper, the method comprising the acts of:
   forming an initially closed covering cap with desired breaking points;
   force-lockingly inserting the covering cap into the flange opening to seal-off the flange opening to the interior space; and
   transporting the caliper with the inserted covering cap.

23. The method according to claim 22, further comprising the acts of:
   mounting an operating member on the mounting flange, said operating member having a plunger rod; and
   tearing-open the covering cap upon initial operation of the operating member to break the seal and extend the plunger rod through the covering cap into the interior space of the caliper.

* * * * *